(12) United States Patent
Paltemaa et al.

(10) Patent No.: US 8,270,407 B2
(45) Date of Patent: Sep. 18, 2012

(54) MANAGING DATA STREAMS IN COMMUNICATION SYSTEM

(75) Inventors: Ilpo Paltemaa, Espoo (FI); Timo Stenberg, Vantaa (FI)

(73) Assignee: Eads Secure Networks Oy, Helsinki (FI)

( * ) Notice: Subject to any disclaimer, the term of this patent is extended or adjusted under 35 U.S.C. 154(b) by 249 days.

(21) Appl. No.: 12/597,593

(22) PCT Filed: Apr. 30, 2008

(86) PCT No.: PCT/FI2008/050236
§ 371 (c)(1),
(2), (4) Date: Jan. 21, 2010

(87) PCT Pub. No.: WO2008/135633
PCT Pub. Date: Nov. 13, 2008

(65) Prior Publication Data
US 2010/0142528 A1    Jun. 10, 2010

(30) Foreign Application Priority Data
May 2, 2007  (FI) ..................... 20075305

(51) Int. Cl.
*H04L 12/28* (2006.01)
(52) U.S. Cl. ......... 370/390; 370/338; 370/401; 370/421
(58) Field of Classification Search .......... 370/390, 370/421, 352, 401
See application file for complete search history.

(56) References Cited

U.S. PATENT DOCUMENTS

| | | | | |
|---|---|---|---|---|
| 4,835,769 A | * | 5/1989 | Donaghue et al. | 370/421 |
| 2003/0002480 A1 | * | 1/2003 | Giustina et al. | 370/352 |
| 2004/0264427 A1 | * | 12/2004 | Jaakkola et al. | 370/338 |
| 2006/0198357 A1 | * | 9/2006 | Qiao | 370/351 |
| 2008/0263660 A1 | * | 10/2008 | Duffau et al. | 726/22 |

FOREIGN PATENT DOCUMENTS

| | | |
|---|---|---|
| DE | 102004008720 | 9/2004 |
| WO | 01/30092 | 4/2001 |
| WO | 02/51072 | 6/2002 |
| WO | 2006/034660 | 9/2005 |
| WO | 2006/048305 | 5/2006 |
| WO | 2007/138404 | 12/2007 |
| WO | 2008/015252 | 2/2008 |

OTHER PUBLICATIONS

Digital cellular telecommunications system (Phase 2+); Mobile Station (MS)—Serving GPRS Support Node (SGSN); Subnetwork Dependent Convergence Protocol (SNDCP) (3GPP TS 44.075 version 6.6.0 Release 6), ETSI TS 144 065 V6.6.0, Jun. 2006, 54 pages.
Radio Equipment and Systems (RES); Terrestrial Trunked Radio (TETRA); Voice plus Data (V+D); TETRA packet data, EPT WG3(98) 005, Draft proposal, Version: 0.1.14, Nov. 1998, 110 pages.

* cited by examiner

*Primary Examiner* — Robert Wilson
*Assistant Examiner* — Mohamed Kamara
(74) *Attorney, Agent, or Firm* — Squire, Sanders (US) LLP (57) ABSTRACT

A method for managing a data stream in a communication system. One or more user stations and switching and management infrastructure are configured with a function that maps packet data protocol addresses of data transmissions to defined service access point identifiers. A packet data context for data transmissions of a packet data service is created by associating a packet data protocol address with a service access point identifier used in an interface between one or more user stations and the switching and management structure. A function is used for determining independently in the one or more user stations or the switching and management infrastructure the service access point identifiers for data transmissions of the packet data service.

31 Claims, 3 Drawing Sheets

MANAGING DATA STREAMS IN COMMUNICATION SYSTEM

FIELD OF THE INVENTION

The present invention relates to communications, and more particularly to a method for managing a data stream in a communication system.

BACKGROUND OF THE INVENTION

In packet data communication, there are four main types of addressing, each with its own unique properties. The basic type is a unicast address that refers to a single sender or a single receiver, and can be used for both sending and receiving. Sending the same data to multiple unicast addresses requires the sender to send all the data many times over, once for each recipient.

When sending data to all possible destinations the sender needs to send the data only once, and all receivers can copy it. This type is referred to as broadcasting.

A multicast address is an identifier that is associated with a group of interested receivers. The sender sends a single datagram to the multicast address, and the routers take care of making copies and sending them to all receivers that have registered their interest in data from that sender.

Accordingly, multicasting of data packets represents a way to deliver information to a group of known destinations simultaneously. The delivery may be optimized by delivering the messages over each link of the network only once, and creating copies only when the links to the destinations split.

Many times one leg of the transmission chain is a critical resource that should not be wasted for multiple transmissions that comprise the same payload. Especially with mobile communication systems the last leg, i.e. the air interface, is a bottleneck and the methods for optimizing the use of this resource are intensively sought after. It is conceived that whenever same information needs to be delivered over packet data connections to several subscribers, required transmission capacity and time for delivering the information should be significantly reduced by use of multicasting.

However, use of multicast in air interface poses two requirements. In an SwMI node that acts as an endpoint for air interface leg the transmissions must correspond to a single data stream, even though the system should be able to accommodate more than one transmission destinations. On the other hand, it must be possible for each of the terminal endpoints to identify the data stream from the other data streams destined it, even if the data streams share a same logical link.

SUMMARY OF THE INVENTION

An object of the present invention is thus to provide methods and an apparatuses for implementing the methods so as to enable use of multicast in the interface between user stations and switching and management infrastructure. The solution should be simple and straightforward such that related operations and signaling is not substantially increased due to application of the multicast service.

The objects of the invention are achieved by a method and an arrangement, which are characterized by what is stated in the independent claims. The preferred embodiments of the invention are disclosed in the dependent claims.

The invention is based on the idea of computing an identifier that identifies a data stream in the transmission link in the participating nodes, the user stations and the switching and management infrastructure elements, independently with a predefined function from the recipient IP address of the data stream.

The solution provides a straightforward and quick mechanism to enable distribution of data packets by means of a channel that may be simultaneously accessed by a controlled group of mobile stations.

BRIEF DESCRIPTION OF THE DRAWINGS

In the following the invention will be described in greater detail by means of preferred embodiments with reference to the attached drawings, in which.

PREFERRED EMBODIMENTS OF THE INVENTION

Some embodiments of the invention will be described in the following implemented in a TETRA network using a GPRS type interconnection to other networks. It is, however, appreciated that the invention is not restricted to this particular communication technology or the specific terms related to it. The invention may be applied to any communication system where a terminal endpoint may maintain more than one parallel data transmission streams. Examples of such systems comprise, for example, GSM/EDGE radio access network (GERAN), universal terrestrial radio access network (UTRAN) and derivatives thereof, Telecommunications Industry Association (TIA) Wideband Air Interface Packet Data Specification.

The following embodiments are exemplary implementations of the present invention. Although the specification may refer to "an", "one", or "some" embodiment(s), reference is not necessarily made to the same embodiment(s), and/or a feature does not apply to a single embodiment only. Single features of different embodiments of this specification may be combined to provide further embodiments.

Figure 1:
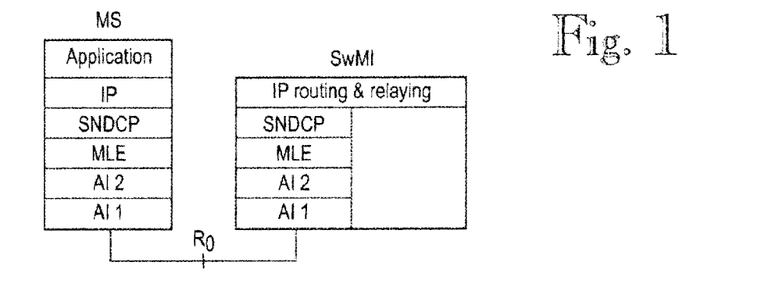
FIG. 1 illustrates embodied network architecture.

Referring to FIG. 1, the basic TETRA network entity is called a Switching and Management Infrastructure (SwMI). The SwMI includes all equipment and means, which enable users to communicate with each other via the SwMI. The exact configuration of the SwMI is not, as such, relevant to the invention. Basically, the SwMI may be any mobile network infrastructure that provides the switching and mobility management functions.

A widely used TETRA network architecture comprises digital exchanges DXT to which the base stations TBS are connected. The TETRA utilizes a distributed subscriber data base structure so that there is a home database (HDB) which comprises permanent information about the individual and/or group subscribers in the subscriber's home network, and a visitor data-base (VDB) which comprises temporary information about individual and/or group subscribers visiting in the network. Typically each DXT is provided with a VDB. Some of the DXTs provide a gateway to other telecommunications networks.

The SwMI communicates over an air interface RO with a TETRA mobile termination MT or a mobile station MS. The MT may be connected to a terminal equipment TE through an interface R1. TETRA subscriptions are identified by TETRA subscriber identities (TSI). Subscriber identities exist in two sizes, TETRA Subscriber Identity (TSI) that is 48 bits long, and Short Subscriber Identity (SSI) that is 24 bits long. The SSI is typically a truncation of the TSI. TSI is unique across the complete TETRA domain; SSI needs to be unique only in one TETRA sub-domain. Each MS or MT typically contains at least one family of TSIs. Each family contains one Individual TETRA Subscriber Identity (ITSI) and may also have one Alias TETRA Subscriber Identity (ATSI) and several Group TETRA Subscriber Identities (GTSI). The TSI family is valid for a home TETRA network.

The TETRA PDP extends the data communication services by providing extended capacity and usability for the TETRA. FIG. 1 illustrates the protocol stacks of the TETRA packet data when the application uses IP protocol and it is located in a mobile station MS. The MS may also be a combination of an IP packet mode Terminal Equipment (TE), such as a Personal Computer (PC), and a TETRA Mobile Termination (MT) having an IP packet data support. The protocol stacks in the MS and the SwMI typically contain the following protocols: the Subnetwork Dependent Convergence Protocol (SNDCP), Mobile Link Entity (MLE), Logical Link Control (LLC), Medium Access Control (MAC), and Air Interface Layer 1 (AI-1).

The air Interface layer 1 (AI-1) is defined in the TETRA specifications and provides a TETRA physical channel over the air interface RO. The MAC controls the access signaling (request and grant) procedures for the radio channel, and the mapping of the LLC frames onto the TETRA physical channel. Logical Link Control (LLC) layer provides a logical link between the MS and the SwMI. The MLE protocol discriminator entity (data transfer) routes TETRA packet data signaling and data to corresponding TETRA Packet data service access point (SAP) at the peer entity (SwMI/MS).

The TETRA packet data is built on top of the MLE layer of the basic TETRA protocol stack and provides service mechanisms to convey different higher layer protocols. The first protocol that is introduced merely for the packet data service is the SNDCP. The SNDCP is a TETRA-specific network layer protocol that has two main functions: 1) to negotiate and maintain TETRA PDP contexts between a MS and the SwMI, and 2) to control the PDP data transfer between the MS and the SwMI.

Before a MS can gain access to any SNDCP services, it firstly goes through a packet data registration procedure, called PDP Context Activation. The PDP Context Activation is typically initiated by the MS. The PDP Context Activation involves the negotiation of a PDP address (e.g. an IPv4 address) and other parameters to be used during data transfer, as well as the binding of a PDP address to a TETRA subscriber identity ITSI. A unique PDP context is established for each PDP address which is active on the network (i.e. ready to transmit or receive data). In addition to the PDP address and the ITSI, the PDP context includes also the SNDCP service access point identifier (SN-SAP), or more generally NSAPI (Network Service Access Point Identifier) through which the services of the SNDCP are available to the upper layer protocols. Two TETRA PDP contexts stored in the MS and the SwMI establish a logical connection therebetween.

A basic TETRA network may be interconnected to other packet data networks (PDN) or external hosts, or other communications networks, by means of a Gn interface and a GPRS gateway support node (GGSN) of the General Packet Radio Service (GPRS).

The general GPRS infrastructure according to the GPRS specifications comprises GPRS support nodes (GSNs), namely a GPRS gateway support node (GGSN) and a GPRS serving support node (SGSN). The main functions of the SGSN are to detect new GPRS mobile stations in its service area, handle the process of registering the new MSs along with the GPRS registers, send/receive data packets to/from the GPRS MS, and keep a record of the location of the MSs inside of its service area. The subscription information is stored in a GPRS register (HLR) where the mapping between a mobile's identity (such as MS-ISDN or IMSI) and the PDP address is stored. The GPRS register acts as a database from which the SGSNs can ask whether a new MS in its area is allowed to join the GPRS network. The SGSNs and GGSNs within one PLMN may be interconnected by an intra-operator backbone network that may be implemented, for example, by means of a local area network, such as an IP network. The interface between SGSNs and GGSNs within one PLMN may be the Gn interface defined in the ETSI/GSM 09.60 technical specification. The protocol between GSN nodes in the GPRS backbone network at the Gn interface within one PLMN and at a Gp interface (the interface between GSNs in different PLMNs) is called the GPRS Tunneling Protocol (GTP). The GTP allows multi-protocol packets to be tunneled through the GPRS backbone between GSNs.

The main functions of the GPRS gateway support node (GGSN) involve interaction with the external data network. The GGSN interconnects an operator's GPRS network to external systems, for example other operators' GPRS systems, data networks, such as an IP network (Internet) or a X.25 network, and service centers. The GGSN includes GPRS subscribers' PDP addresses and routing information, i.e. SGSN addresses. Routing information is used for GTP tunneling of the protocol data units (PDUs) from the external network to the current access point of the MS, i.e. to the serving SGSN.

In order to access the GPRS services, a MS first makes its presence known to the network by performing a GPRS attach. This operation establishes a logical link between the MS and the SGSN, and makes the MS available for short message service (SMS) over GPRS, paging via SGSN, and notification of incoming GPRS data. More particularly, when the MS attaches to the GPRS network, i.e. in a GPRS attach procedure; the SGSN creates a mobility management context (MM context), and a logical link LLC (Logical Link Control) established between the MS and the SGSN in a protocol layer. MM contexts are stored in the SGSN and MS. The MM context of the SGSN may contain subscriber data, such as the subscriber's IMSI (International Mobile Subscriber Identity), TLLI and location and routing information, etc.

In order to send and receive GPRS data, the MS shall activate the packet data address that it wants to use, by requesting a PDP activation procedure. This operation makes the MS known in the corresponding GGSN, and interworking with external data networks can commence. More particularly, one or more PDP context is created in the MS and the GGSN and the SGSN, and stored in the serving SGSN in connection with the MM context.

The PDP context defines different data transmission parameters, such as the PDP type (e.g. X.25 or IP), PDP address (e.g. IP address), quality of service QoS and NSAPI (Network Service Access Point Identifier). Two associated PDP contexts in different GSN nodes define a GTP tunnel. The tunnel is identified with a Tunnel ID (TID), which consists of the IMSI and the NSAPI. The MS activates the PDP context with a specific message, Activate PDP Context Request, in which it gives information on the TLLI, PDP type, PDP address, required QoS and NSAPI, and optionally the access point name APN. The SGSN send a create PDP context message to the GGSN which creates the PDP context and send it to SGSN. SGSN sends the PDP context to MS in Activate PDP Context Response message, and a virtual connection or link between the MS and the GGSN is established. As a result the SGSN forwards all data packets from the MS to the GGSN, and the GGSN forwards to the SGSN all data packets received form the external network and addressed to the MS. The PDP context is stored in the MS, the SGSN and the GGSN. When the MS roams to the area of a new SGSN, the new SGSN requests MM and PDP contexts from the old SGSN.

Figure 2:
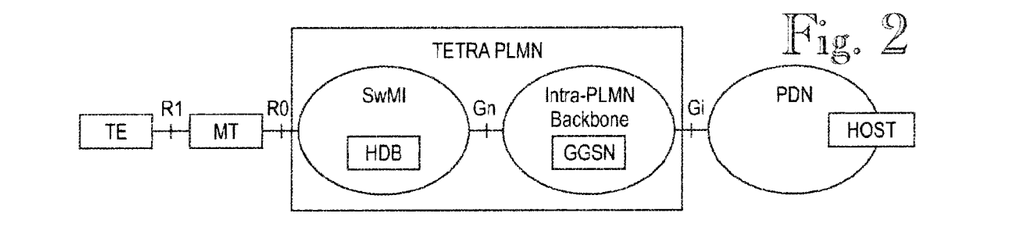
FIG. 2 illustrates interconnection of the embodied network packet data network.

FIG. 2 illustrates an exemplary embodiment of the invention where the TETRA network is interconnected to packet data network via the above GPRS type network infrastructure. In FIG. 2 the GGSN is shown located in a private IP network called an Intra-PLMN Backbone. The combination of SwMI and the Intra-PLMN Backbone is named a TETRA PLMN. The SwMI and the Intra-PLMN Backbone are interconnected with the Gn interface defined in the ETSI GPRS specifications. The SGSN and the mobility management features of the GPRS are not utilized as such in the TETRA PLMN; instead of GPRS MM and HLR and VLR functions, TETRA Mobility Management (MM) and TETRA Home DataBase (HDB) and Visitor Database functions are used. The IP routing and relaying layer is modified to support the Gn interface and to adapt it to the TETRA PDP. It should be noted that the division of disclosed function into separate network elements is not relevant in interpretations of the scope of protection. For example, to a person skilled in the art it is apparent to apply the relevant functions of SwMI with SGSN and Base Station Controller (BSC) elements of a basic GPRS architecture, or the derivatives thereof.

The main functions of SwMI in FIG. 2 include the standard functions of the TETRA SwMI, namely the network access control, the mobility management, the radio resource management, the base station functions and the HDB/VDB functions, as well as the functionality which provides the Gn interface for the GGSN. The GGSN, on the other hand, provides the interworking with external IP networks, such as the IP address allocation, the IP routing, the IP user authentication, the IP tunneling and the IP encryption.

The legends in the FIG. 2 have the following meanings:
TETRA PLMN: The TETRA network, which is a combination of a TETRA SwMI and an Intra-PLMN Backbone.
SwMI: a TETRA Switching and Management Infrastructure.
HDB: a data base which comprises information about the individual and/or group subscribers and is located in the subscriber's home SwMI.
GGSN: a Gateway GPRS Support Node.
Intra-PLMN Backbone: a private IP network interconnecting IP network nodes, such as the GGSN.
PDN: an IP Packet Data Network, such as the Internet or a private intranet.
Host: an IP host computer, such as an e-mail server or an ordinary PC.
R1: the TETRA reference point between the packet mode TE and the MT.
R0: the reference point at the TETRA air interface for IP packet data.
Gn, here: the reference point between the SwMI and the GGSN within the same TETRA PLMN.
Gi, here: the reference point between an Intra-PLMN Backbone and an external IP PDN.

Figure 3:
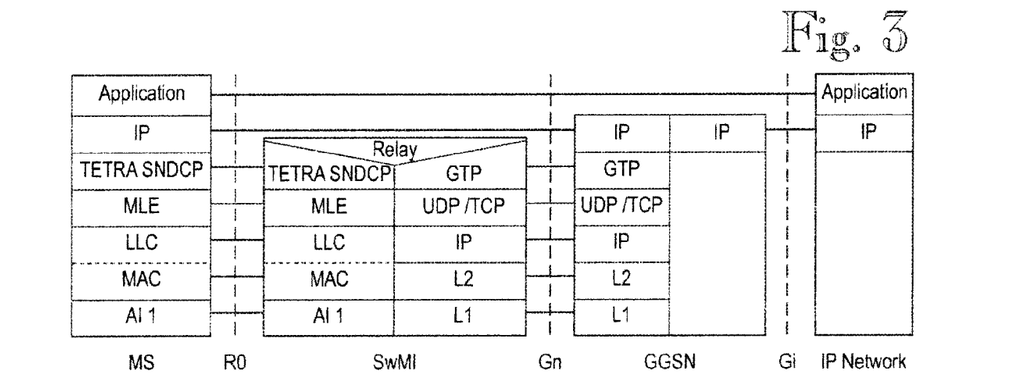
FIG. 3 illustrates the transmission and signaling planes of the TETRA PDP with the GGSN.

FIG. 3 illustrates the transmission and signaling planes of the TETRA PDP with the GGSN. The protocol structure is a combination of trans-mission planes described in TETRA and GPRS specifications. The connection is done by a relay function in the SwMI, which relays PDP PDUs between the Ro and Gn interfaces.

The TETRA protocol stacks were described above with reference to FIG. 1. In the Gn interface the GPRS Tunneling Protocol (GTP) tunnels the user data and the signaling messages between the SwMI and the GGSN. The User Datagram Protocol (UDP) and the Transmission Control Protocol (TCP) are alternative protocols, which can be used with the underlying IP layer to transfer GTP signaling between the SwMI and the GGSN. Layer 1 (L1) and Layer 2 (L2) are physical and data link layers at the bottom of the protocol stack.

The set of protocol entities above SNDCP uses the same SNDCP entity, which then performs multiplexing of data coming from different sources to be sent across a single LLC connection. Sharing a single LLC connection requires that different addresses can be identified. As discussed above, the NSAPI field of four bits is used for this purpose to define the end user PDP type and PDP address pair that the MS is using. Following values are according to mutually agreed specifications reserved for special use:
NSAPI=0 is reserved;
NSAPI=15 is reserved.

Conventionally, the user application should start from NSAPI value 1 when allocating the first Packet Data Protocol (PDP) context. Other values may be allocated dynamically. The allocation of the dynamic NSAPIs could be, for example, following:
IPv4: 133.12.75.111=>NSAPI=2
IPv4: 133.12.75.222=>NSAPI=3.

Multicasting is a way to deliver information to a group of destinations simultaneously. The delivery may be optimized by delivering the messages over each link of the network only once, and creating copies only when the links to the destinations split. Especially with mobile communication systems the last leg, i.e. the air interface, is a deficient resource and therefore methods for optimizing the use of this resource are intensively promoted. In cases where same information needs to be delivered over packet data connections to several subscribers, required transmission capacity and time for delivering the information may be reduced by use of multicasting.

However, use of multicast in air interface poses two requirements. In an SwMI node that acts as an endpoint for air interface leg the transmissions must correspond to a single data stream, even though there may be more than one transmission destinations involved. On the other hand, it must be possible for each of the terminal endpoints to identify the data stream from the other data streams destined it, even if the data streams share a same logical link. In terms of the embodiment of FIG. 2, this means that SwMI should be able to associate data packets arriving from GGSN over a defined connection to one NSAPI. On the other hand, the mobile stations should be able to use NSAPI to identify in the LLC layer the PDP context from the other possibly activated PDP contexts. The defined connection may be, for example, a GTP tunnel established between GGSN and SwMI.

It is appreciated that the method if identifying data streams between the SwMI and the core network is not relevant to the invention as such; other mechanisms may also be used without deviating from the scope of protection. These two requirements should preferably be fulfilled without compromising the dynamic nature of NSAPI allocation, but also without laborious procedures in the SwMI end for maintaining data on various individual NSAPI allocations of each participating mobile station.

In the embodiment according to the invention, the use of multicast in the final lap is facilitated in dynamic allocation of the NSAPI by using in both ends a function that maps an input IP address into one allowed NSAPI value. This function is configured to the participating SwMI node or SwMI nodes and to the mobile station so that all mobile stations that participate in the multicast end up independently allocating to the multicast data stream the same NSAPI value. Additionally, the network node uses the same function and therefore ends up to the same NSAPI value and thereafter use it in its operations towards the terminal nodes and the relevant GGSN. The procedure enables straightforward mode of operation where the dynamic allocation of NSAPI values may be implemented without having to maintain and compare NSAPI allocation status of a plurality of independently operating terminal nodes.

In the following, use of such function is illustrated with the embodied system configuration of FIGS. 2 and 3. The block chart of FIG. 4 and the flow chart of FIG. 5 illustrate the procedures for implementing a connection between SwMI and the mobile station for reception of an exemplary IP multicast service. It should be noted that IP multicast is used here as an example of a service where the advantages of the invention are easily detectable. Application of the solution to other environments and to other type of services is obvious for a person skilled in the art.

In the beginning the mobile station subscribes to the multicast service. Subscription establishes a relationship between the mobile station user and the service provider, and allows the user to receive the related multicast service. Basically service subscription represents the agreement of a user to receive services offered by the operator. Subscription information is recorded in a host that acts as a service center of the multicast service.

Multicast service announcement or discovery mechanisms allow users to request or to be informed about the range of multicast user services available. This includes operator specific multicast user services as well as services from content providers outside of the own TETRA network. Service announcements may used to distribute to users information about the service, parameters required for service activation, for example IP multicast addresses and possibly other service related parameters, for example service start time.

Clearly there exist several possible service provision and service discovery mechanisms. These include standard mechanisms such as SMS, or depending on the capability of the terminal, applications that encourage user interrogation. Conventionally, at least the following mechanisms have been considered for multicast user service announcement mechanisms:

SMS cell broadcast to advertise multicast user services;
PUSH mechanism (Wireless Application Protocol (WAP), SMSPoint-to-Point, Multimedia Messaging Service (MMS));
Uniform Resource Locator (URL).

In the embodied example, a new mechanism utilizing the group communication architecture configured to the professional mobile radio system is used for service announcement. The group communication mechanism provides a straightforward and quick way to allow users to monitor defined groups relevant for their communication purposes and to receive information on the possibility to participate a session of a multicast service. It is clear that the following mechanism is applicable to the present invention, but it may be utilized also independently of the method of identification of the data streams in the air interface. Correspondingly, other service announcement mechanisms may be used without deviating from the scope of protection of the present application.

Group communication, as used herein, refers to a multipoint communication relationship that exists between the members of a group for the purpose of transferring data. Groups are created logically, which means that special group communication information maintained in the system associates a specific user with a particular group. One user may be a member in one or more groups, and the association can typically be dynamically created, modified and/or cancelled.

Figure 4:
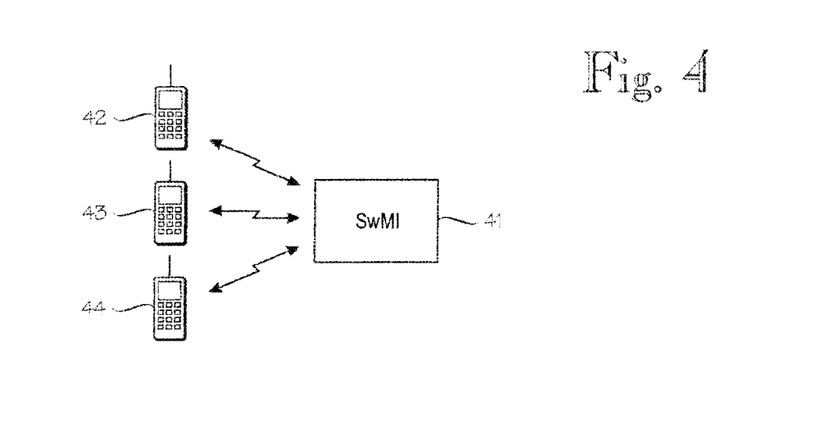
FIG. 4 illustrates the basic scheme of TETRA group communication.
Figure 5:
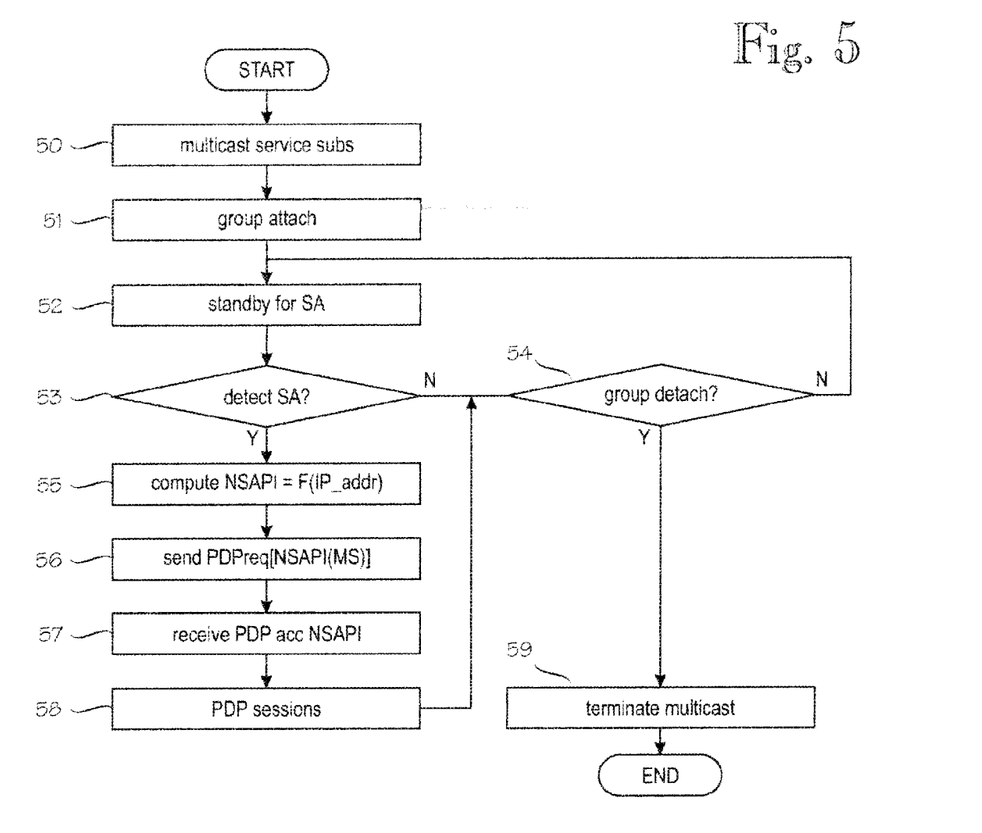
FIG. 5 illustrates the procedure for implementing a connection between SwMI and the mobile station for reception of an exemplary IP multicast service.

The basic scheme of TETRA group communication is illustrated in FIG. 4. FIG. 4 shows SwMI 41 and a group of mobile stations 42, 43, 44 that reside in the same cell such that air interface resource allocations for the mobile stations may be made by the same SwMI entities. As discussed above with TETRA identities, SwMI comprises definitions on group identities used in the TETRA. In TETRA Systems attachment/detachment of group identities allows a user application to either activate or deactivate predefined group identities in the mobile station. After attaching to a group the mobile station begins to receive signaling addressed the group, and is thereby able to become involved with the communications and resource allocations of the group. A channel used for group signaling or traffic may thus be shared by the plurality of the mobile stations 42, 43, 44. Additionally, priority scanning allows the mobile stations not currently attached to the group monitor the communication state of the group and attach to the group whenever it detects activity in the group.

Accordingly, in step 50 of the present embodiment, the mobile station is subscribed to the service using the conventional group management procedures of the TETRA system. By becoming a member of the multicast group, the TETRA subscriber is subscribed to the corresponding multicast service. Typically in TETRA system the group management is implemented in dispatcher workstations according to the operational configurations of the user base. Subscription to the multicast service through the existing group management procedures provides a quick and efficient method of managing the recipients in multicast service.

In step 51 the mobile station attaches to a predefined multicast group such that the normal group communication procedures will provide support for multicast service session set-up. In TETRA systems step 51 may be implemented by direct group attachment or through a combination of priority scanning and related group attachment.

In step 52 the mobile station is standby for service announcements of multicast service, implemented through signaling channels of the group addressable with a GTSI allocated to the multicast group. In step 53 the mobile station checks whether a service announcement is received. In case of negative finding in step 53 the mobile station checks (step 54) whether group detach is detected. In case of negative finding in step 54, the mobile station returns to step 52 to standby for service announcements. In case of positive finding in step 54, the mobile station terminates the multicast procedure.

A positive finding in step 53 means that the mobile station has received a service announcement that comprises an IP address, here the IP Multicast address to be bound to a PDP context. According to the embodiment, the mobile station is configured with a predefined function F that maps the received IP multicast address to an NSAPI value. For example, the function could be configured to count octets of IP multicast address, sum them, take modulo 12 from the sum and add 3 to the result. If the mobile station thus computes the NSAPI value with a function F of the IP multicast address IP_addr, allocation of the multicast NSAPI thus becomes the following:

$F(239.3.2.8) = MOD((239+3+2+8);12)+3 = 0+3 = 3$
$F(239.3.2.19) = MOD((239+3+2+19);12)+3 = 11+3 = 14$
  IPv4: 239.3.2.8 => NSAPI=3
  IPv4: 239.3.2.19 => NSAPI=14.

Accordingly, with the choice of function, IP multicast addresses are allocated between 3-14, and 1 and 2 remain reserved for the point-to-point IP addresses. In view of the above example:

$F(239.3.2.8) = MOD((239+3+2+8);12)+3 = 0+3 = 3$
$F(239.3.2.9) = MOD((239+3+2+9);12)+3 = 1+3 = 4$
$F(239.3.2.10) = MOD((239+3+2+10);12)+3 = 2+3 = 5$
$F(239.3.2.11) = MOD((239+3+2+11);12)+3 = 3+3 = 6$
$F(239.3.2.12) = MOD((239+3+2+12);12)+3 = 4+3 = 7$
$F(239.3.2.13) = MOD((239+3+2+13);12)+3 = 5+3 = 8$
$F(239.3.2.14) = MOD((239+3+2+14);12)+3 = 6+3 = 9$
$F(239.3.2.15) = MOD((239+3+2+15);12)+3 = 7+3 = 10$
$F(239.3.2.16) = MOD((239+3+2+16);12)+3 = 8+3 = 11$
$F(239.3.2.17) = MOD((239+3+2+17);12)+3 = 9+3 = 12$
$F(239.3.2.18) = MOD((239+3+2+18);12)+3 = 10+3 = 13$
$F(239.3.2.19) = MOD((239+3+2+19);12)+3 = 11+3 = 14$
$F(239.3.2.20) = MOD((239+3+2+20);12)+3 = 0+3 = 3$
$F(239.3.2.21) = MOD((239+3+2+21);12)+3 = 1+3 = 4$.

Terminals that belong to the same group use the same IP Multicast address and the same function for determining the NSAPI and thus all get the same NSAPI result. This NSAPI they will provide to SwMI as NSAPI of the PDP context. It is clear that the above function is given an example only. Any predefined function that fulfils the other application specific restrictions on NSAPI values may be used in computations without deviating from the scope of protection.

After counting the NSAPI, the mobile station stores the computed NSAPI value and also sends (step 56) it in the PDP activation request to SwMI. SwMI makes the checks on the PDP context and associates the NSAPI with the IP Multicast address and the communication connection the GGSN. In case the finding of such checks is positive, SwMI acknowledges the successful context with a PDP context accept message that the mobile station receives in step 57. The operation in the SwMI end is disclosed in more detail with FIG. 5.

After context activation, one or more successive PDP sessions may take place (step 58) in the mobile station in a conventional manner via a packet data channels (PDCH) allocated for the transmissions. The procedure of FIG. 5 ends by the mobile station terminating the multicast communication service (step 59), for example, by detaching from the group, explicitly or at detaching from the mobile communications system.

Figure 6:
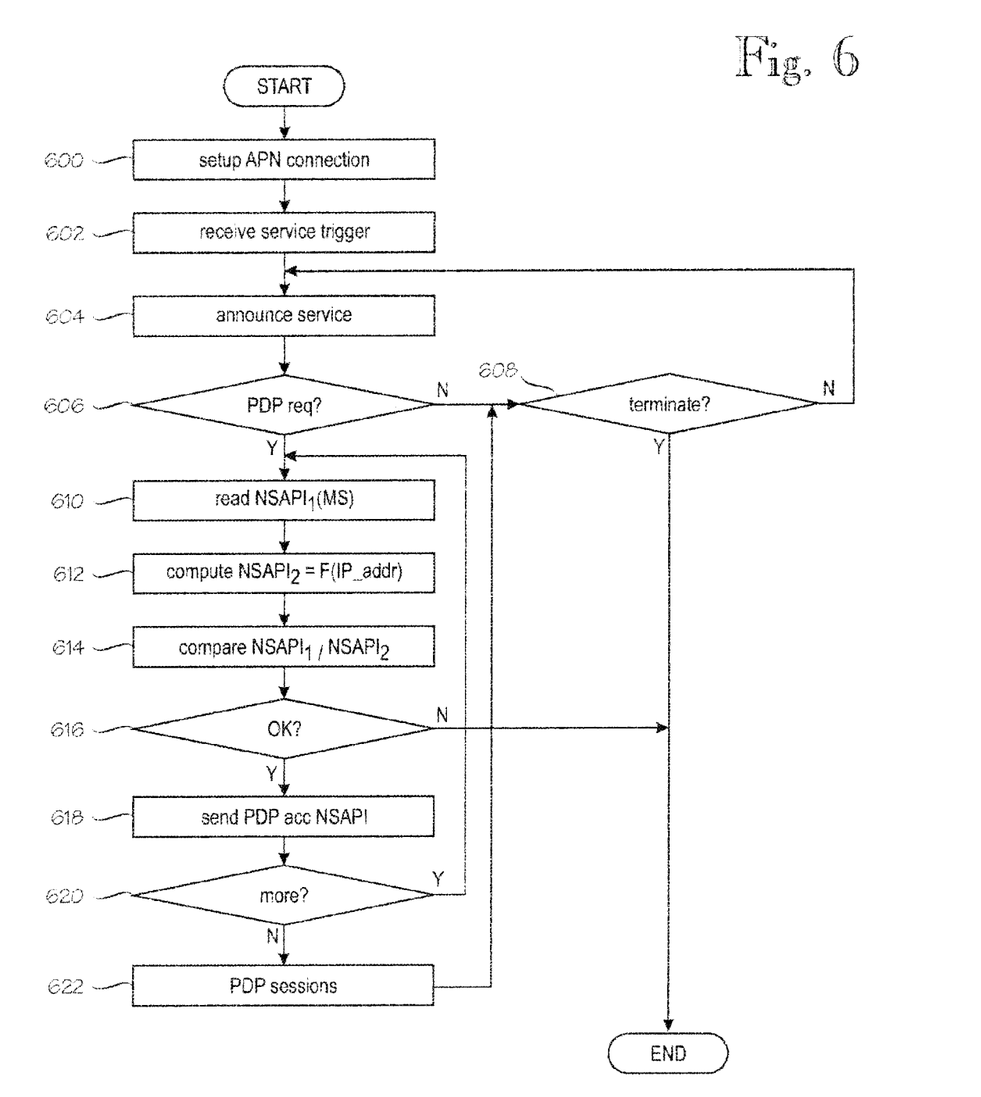
FIG. 6 illustrates the corresponding procedure in a SwMI element for implementing IP multicast service between SwMI and the mobile station.

The flow chart of FIG. 6 illustrates the corresponding procedure in an SwMI element for implementing IP multicast service between SwMI and the mobile station. In the system configuration of FIG. 2 the responsible SwMI element is the digital TETRA exchange DXT. In other system configurations the SwMI element may be implemented with one network element or divided into two elements, like SGSN and BSC.

In step 600 the DXT creates a connection to the GGSN that acts as the access point to the IP Multicast service. The connection may be implemented, for example, as an IP tunnel. Alternatively, in case the service uses dedicated IP multicast addresses that the SwMI element may recognize, the APN connection may be implemented by configuring DXT to recognize the IP multicast address in one of the initial GGSN messages and forward the messages to a predefined IP multicast group in a manner described below. Such configuration enables IP multicasting without need for much signaled interaction with the transmitting GGSN.

In step 602 the DXT receives a service trigger from the GGSN. Depending on the application, such service trigger may be a signaling message, or a first data packet of the IP Multicast. Advantageously, according to established disciplines of data multicasting, the GGSN or any nodes between the DXT and GGSN are not expected to forward the IP multicast signaling messages to the DXT unless at least one mobile station user operating in the service area of DXT is subscribed to the IP multicast service.

In response to the service trigger, DXT announces (step 604) service to a predefined group established for the IP multicast service, as discussed in connection with steps 42 and 43 of FIG. 4. DXT checks (step 606) for PDP context activation requests from mobile stations that have received the service announcement. In case no requests are received within a defined period of time, in response to a negative finding in step 606 the procedure moves to step 608 where it is checked whether the IP multicast service will be terminated or not. In case of negative finding in step 608, the procedures moves back to standby for announcing the service. It should be noted that with appropriate scanning options supported in the mobile stations, an ongoing session may also act as a service announcement. Mobile stations may thereby acquire information on an ongoing IP multicast and join the multicast session or sessions even if they did not respond to the original service announcement.

A positive finding in step 606 indicates that DXT has received a PDP context activation request comprising an NSAPI value. The procedure moves to step 610 where DXT reads the received NSAPI value $NSAPI_1$. According to the embodiment, DXT is also configured with the predefined function F that maps the received IP multicast address to an NSAPI value. When DXT thus computes the NSAPI value with a function F of the IP multicast address IP_addr, it ends up to a NSAPI value $NSAPI_2$ that should now be the same as the received $NSAPI_1$ value. In step 614 DXT checks whether the values match, and in case of positive finding (step 616) confirms the PDP context by sending (step 618) a PDP accept comprising the checked $NSAPI=NSAPI_1=NSAPI_2$ value to the mobile station.

In step 620 DXT checks whether there is pending another PDP context request related to the IP multicast service. In case of positive finding in step 620, the procedure moves to step 610 to read the NSAPI value of the next mobile station that wishes to participate in the IP multicast service. In case of negative finding in step 620, the procedure moves to step 622 where DXT initiates the management and PDCH resource allocations for the one or more IP sessions of the IP multicast using the conventional call control and mobility management procedures of the TETRA system.

The methods illustrated in FIGS. 5 and 6 provide a straightforward and quick mechanism to enable distribution of IP packets by means of channel that may be simultaneously accessed by a controlled group of mobile stations. The method may be implemented in both ends of the air interface link independent of each other such that no additional signaling and bookkeeping to maintain the NSAPI allocations of the whole group in order are necessary.

Figure 7:
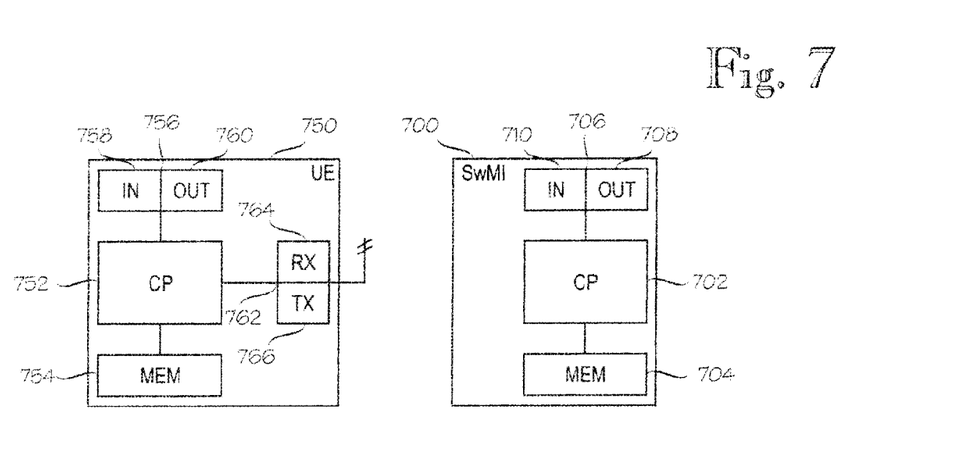
FIG. 7 illustrates a reference configuration for embodiments of a mobile station and SwMI element.

FIG. 7 illustrates a reference configuration for embodiments of a user station and SwMI element, like DXT, capable of performing the methods of FIGS. 5 and 6. The user station of FIG. 1 is a mobile station, but for a person skilled in the art it is clear that the invention may be applied in any type of user stations, including mobile and fixed stations, and combinations thereof.

The SwMI element 700 comprises processing unit 702, which is an element that comprises an arithmetic logic unit, a number of special registers and control circuits. Connected to the processing unit is a memory unit 704, a data medium where computer-readable data or programs or user data can be stored. The SwMI element also comprises an interface unit 706 with input unit 708 for inputting data from other SwMI elements, for internal processing in the SwMI element, and output unit 710 for outputting data from the internal processes of the SwMI element to the other SwMI elements. Examples of elements of said input unit comprise network interfaces, generally known to a person skilled in the art. The processing unit 702, memory unit 704, and the interface unit 708, of the SwMI element are electrically interconnected for performing systematic execution of operations on the received and/or stored data according to predefined, essentially programmed processes of the unit. In systematic execution of the operations the processing unit 702 acts a control unit that may be implemented as a single integrated circuit, or a combination or two or more functionally combined integrated circuits. In a solution according to the invention, the operations comprise the functionality of the SwMI element as described with FIG. 5. For a person skilled in the art it is clear that a SwMI comprises a plurality of other conventional functionalities not specifically disclosed herein.

The mobile station 750 of FIG. 7 comprises a processing unit 752, and a memory unit 754. The mobile station also comprises a user interface unit 756 with input unit 758 for inputting data by the user for internal processing in the unit, and output unit 760 for outputting user data from the internal processes of the unit. Examples of said input unit comprise a keypad, or a touch screen, a microphone, or the like. Examples of said output unit comprise a screen, a touch screen, a loudspeaker, or the like.

The mobile station also comprises a radio communication unit 762 configured with a receiver 764 for receiving information from the radio network over the air interface and processing it for inputting to the processing unit 750, as well as a transmitter 766 for receiving information from the processing unit 750, for further processing and transmitting the information via the air interface to the radio network. The processing unit 752, the memory unit 754, the user interface unit 756, and the radio communication unit 762 are electrically interconnected for performing systematic execution of operations on the received and/or stored data according to predefined, essentially programmed processes of the mobile station. In a solution according to the invention, the operations comprise the functionality of the mobile station as described with FIG. 4.

The embodiments of the invention may be implemented as computer program comprising instructions for managing a data stream in a communication system a communication system. The process comprises the steps of configuring the one or more user stations and switching and management infrastructure with a function that maps packet data protocol addresses of data transmissions to defined service access point identifiers; creating a packet data context for data transmissions of a packet data service by associating a packet data protocol address with a service access point identifier used in an interface between one or more user stations and the switching and management structure; and using the function for determining independently in the one or more user stations or the switching and management infrastructure the service access point identifiers for data transmissions of the packet data service.

The embodiments of the invention may be implemented as computer program comprising instructions for executing a computer process for receiving a data stream in a user station for a communication system. The process comprises the steps of configuring the user station with a function that maps packet data protocol addresses of data transmissions of the data stream to defined service access point identifiers; creating a packet data context for data transmissions of a packet data service by associating a packet data protocol address with a service access point identifier used in the interface between the user station and a switching and management structure, and using the function for determining the service access point identifiers independently of the one or more other user stations or the switching and management infrastructure data transmissions of the packet data service.

The embodiments of the invention may be implemented as computer program comprising instructions for executing a computer process for transmitting a data stream in a switching and management structure element for a communication system. The process comprises the steps of configuring the switching and management infrastructure element with a function that maps packet data protocol addresses of data transmissions of the data stream to defined service access point identifiers; creating a packet data context for data transmissions of a packet data service by associating a packet data protocol address with a service access point identifier used in an interface between one or more user stations and the switching and management structure, using the function for determining the service access point identifiers for data transmissions of the packet data service independently of the one or more user stations.

The computer programs may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
  configuring one or more user stations and a switching and management infrastructure with a function that maps packet data protocol addresses of data transmissions to defined service access point identifiers;
  creating a packet data context for data transmissions of a packet data service by: associating a packet data protocol address with a service access point identifier used in an interface between the one or more user stations and the switching and management infrastructure;
  using the function to determine independently in the one or more user stations or the switching and management infrastructure the service access point identifiers for data transmissions of the packet data service;

sending from a user station to an element of the switching and management infrastructure a packet data context activation request that comprises the independently determined service access point identifier; and sending from the element of the switching and management infrastructure to the user station a packet data context accept message, if the service access point identifier sent from the user station matches with a service access point identifier determined by the switching and management infrastructure.

2. The method according to claim 1, wherein the function maps each of the packet data protocol addresses to a different service access point identifier.

3. The method according to claim 1, wherein the one or more user stations is configured to group communication using a group subscriber identity.

4. The method according to claim 1, wherein the user station is a mobile station.

5. The method according to claim 1, wherein the packet data service is IP multicast service.

6. The method according to claim 3, further comprising announcing the packet data service through signalling channels of the group communication.

7. The method according to claim 1, further comprising determining the service access point identifier in the user station and, in the switching and management infrastructure, managing radio resource allocations of the user station by computing the service access point identifier using the function.

8. The method according to claim 1, wherein the function comprises the steps of:
    counting octets of the packet data protocol address;
    summing the octets;
    taking modulo 12 from the sum; and
    adding 3 to the result.

9. The method according to claim 1, further comprising allocating to the data transmissions a packet data channel that may be simultaneously accessed by more than one user station.

10. The method according to claim 1, wherein the interface is an air interface.

11. The method according to claim 1, wherein the switching and management infrastructure and the user station supports the TETRA technology.

12. The method according to claim 1, wherein the data stream corresponds to one IP data service.

13. A method, comprising:
    configuring the user station with a function that maps packet data protocol addresses of data transmissions of the data stream to defined service access point identifiers;
    creating a packet data context for data transmissions of a packet data service by associating a packet data protocol address of the packet data service with a service access point identifier used in an interface between the user station and a switching and management infrastructure of the communication system;
    using the function to determine the service access point identifier independently of one or more other user stations or the switching and management infrastructure for data transmissions of the packet data service;
    sending to the switching and management infrastructure a packet data context activation request that comprises the independently determined service access point identifier; and
    receiving a packet data context accept message, if the independently determined service access point identifier matches with a service access point identifier determined independently of the user station by the switching and management infrastructure.

14. The method according to claim 13, wherein the function maps each of the packet data protocol addresses to a different service access point identifier.

15. The method according to claim 13, wherein the user station is configured to group communication with a multicast group subscriber identity.

16. The method according to claim 13, wherein the user station is a mobile station.

17. The method according to claim 13, wherein the packet data service is IP multicast service.

18. The method according to claim 15, further comprising receiving announcements of the packet data service through the group communication signalling channels.

19. The method according to claim 13, further comprising determining the service access point identifier by computing the service access point identifier using the predefined function.

20. The method according to claim 13, wherein the function comprises the steps of:
    counting octets of the packet data protocol address;
    summing the octets;
    taking modulo 12 from the sum; and
    adding 3 to the result.

21. A method, comprising:
    configuring a switching and management infrastructure element with a function that maps packet data protocol addresses of data transmissions of the data stream to defined service access point identifiers;
    creating a packet data context for data transmissions of a packet data service by: associating a packet data protocol address of the packet data service with a service access point identifier used in an interface between one or more user stations and the switching and management infrastructure;
    using the function to determine the service access point identifiers for data transmissions of the packet data service independently of the one or more user stations;
    receiving from a user station a packet data context activation request that comprises a service access point identifier; and
    sending a packet data context accept message, if the received service access point identifier matches with the determined service access point identifier.

22. The method according to claim 21, wherein the function maps each of the packet data protocol addresses to a different service access point identifier.

23. The method according to claim 21, wherein the one or more user station is configured to group communication using a group subscriber identity, and the packet data service is announced through signalling channels of the group communication.

24. The method according to claim 21, wherein the packet data service is IP multicast service.

25. The method according to claim 21, further comprising determining the service access point identifier in the user station and, in the switching and management infrastructure, managing radio resource allocations of the user station by computing the service access point identifier using the function.

26. The method according to claim 21, wherein the function comprises the steps of:
    counting octets of the packet data protocol address;
    summing the octets;
    taking modulo 12 from the sum; and
    adding 3 to the result.

27. The method according to claim 21, further comprising allocating to the data transmissions a packet data channel that may be simultaneously accessed by more than one user station.

28. An user equipment comprising:
a processor unit;
at least one memory including computer program code;
the at least one memory and the computer program code configured to, with the processor unit, cause the user equipment to
configure the user equipment with a function that maps packet data protocol addresses of data transmissions of the data stream to defined service access point identifiers;
create a packet data context for data transmissions of a packet data service by associating a packet data protocol address of the packet data service with a service access point identifier used in the interface between the user equipment and a switching and management infrastructure of the communication system;
use the function to determine the service access point identifier independently of the one or more other user stations or the switching and management infrastructure for data transmissions of the packet data service;
send to the switching and management infrastructure a packet data context activation request that comprises the independently determined service access point identifier; and
receive a packet data context accept message, if the independently determined service access point identifier matches with a service access point identifier determined independently of the user equipment by the switching and management infrastructure.

29. A switching and management infrastructure element comprising:
a processor unit;
at least one memory including computer program code;
the at least one memory and the computer program code configured to, with the processor unit, cause the switching and management infrastructure element to
configure the switching and management infrastructure element with a function that maps packet data protocol addresses of data transmissions of the data stream to defined service access point identifiers;
create a packet data context for data transmissions of a packet data service by: associating a packet data protocol address of the packet data service with a service access point identifier used in an interface between one or more user stations and the switching and management infrastructure;
use the function to determine the service access point identifiers for data transmissions of the packet data service independently of the one or more user stations;
receive from a user station a packet data context activation request that comprises a service access point identifier; and
send a packet data context accept message, if the received service access point identifier matches with the determined service access point identifier.

30. A mobile communication system, comprising:
a user equipment configured to
configure the user equipment with a function that maps packet data protocol addresses of data transmissions of the data stream to defined service access point identifiers;
create a packet data context for data transmissions of a packet data service by associating a packet data protocol address of the packet data service with a service access point identifier used in the interface between the user equipment and a switching and management infrastructure of the communication system;
use the function to determine the service access point identifier independently of the one or more other user stations or the switching and management infrastructure for data transmissions of the packet data service;
send to the switching and management infrastructure a packet data context activation request that comprises the independently determined service access point identifier; and
receive a packet data context accept message, if the independently determined service access point identifier matches with a service access point identifier determined independently of the user equipment by the switching and management infrastructure; and
a switching and management infrastructure element configured to
configure the switching and management infrastructure element with a function that maps packet data protocol addresses of data transmissions of the data stream to defined service access point identifiers;
create a packet data context for data transmissions of a packet data service by: associating a packet data protocol address of the packet data service with a service access point identifier used in an interface between one or more user stations and the switching and management infrastructure;
use the function for determining the service access point identifiers for data transmissions of the packet data service independently of the one or more user stations;
receive from a user station a packet data context activation request that comprises a service access point identifier; and
send a packet data context accept message, if the received service access point identifier matches with the determined service access point identifier.

31. A non-transitory computer readable device encoding a computer program of instructions which, when executed by a computer, causes the computer to perform:
configuring a user station with a function that maps packet data protocol addresses of data transmissions of the data stream to defined service access point identifiers;
creating a packet data context for data transmissions of a packet data service by associating a packet data protocol address of the packet data service with a service access point identifier used in the interface between the user station and a switching and management infrastructure of the communication system;
using the function to determine the service access point identifier independently of the one or more other user stations or the switching and management infrastructure for data transmissions of the packet data service;
sending to the switching and management infrastructure a packet data context activation request that comprises the independently determined service access point identifier; and
receiving a packet data context accept message, if the independently determined service access point identifier matches with a service access point identifier determined independently of the user station by the switching and management infrastructure.

* * * * *